US008165600B2

(12) United States Patent
Walter (10) Patent No.: US 8,165,600 B2
(45) Date of Patent: Apr. 24, 2012

(54) SYSTEM AND METHOD FOR ADVERTISING TO A WI-FI DEVICE (75) Inventor: Edward Walter, Boeme, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 12/761,671

(22) Filed: Apr. 16, 2010

(65) Prior Publication Data
US 2010/0217661 A1 Aug. 26, 2010

Related U.S. Application Data (62) Division of application No. 10/915,685, filed on Aug. 10, 2004, now Pat. No. 7,730,485.

(51) Int. Cl.
H04W 24/00 (2009.01)
G06Q 30/00 (2006.01)
(52) U.S. Cl. ............. 455/456.1; 455/457; 705/26.61
(58) Field of Classification Search ............. 455/414.1, 455/456.1, 456, 456.3, 411, 456.2, 457; 705/26.1, 705/26.61, 26.7, 26.9, 27.1; 707/770, 771, 707/922, 948, 959, 960; 709/223
See application file for complete search history.

(56) References Cited

U.S. PATENT DOCUMENTS

| 5,432,842 A | 7/1995 | Kinoshita et al. |
| 5,850,444 A | 12/1998 | Rune |
| 6,055,494 A | 4/2000 | Friedman |
| 6,178,506 B1 | 1/2001 | Quick, Jr. |
| 6,236,852 B1 | 5/2001 | Veerasamy et al. |
| 6,381,583 B1 | 4/2002 | Kenney |
| 6,424,840 B1 * | 7/2002 | Fitch et al. ............. 455/456.1 |
| 6,542,934 B1 | 4/2003 | Bader |
| 6,584,375 B2 | 6/2003 | Bancroft |
| 6,587,835 B1 | 7/2003 | Treyz |
| 6,618,594 B1 * | 9/2003 | Myers et al. ............. 455/457 |
| 6,651,053 B1 | 11/2003 | Rothschild |
| 6,731,238 B2 | 5/2004 | Johnson |
| 6,731,940 B1 | 5/2004 | Nagendran |
| 6,742,037 B1 | 5/2004 | Hall et al. |
| 6,795,700 B2 | 9/2004 | Karaoguz et al. |
| 6,813,501 B2 | 11/2004 | Kinnunen et al. |

(Continued)

FOREIGN PATENT DOCUMENTS

WO 0235880 A2 5/2002

(Continued)

OTHER PUBLICATIONS

International Search Report and Written Opinion of the International Searching Authority for International Application No. PCT/US05/25362, mailed on Nov. 20, 2007.

(Continued)

Primary Examiner — Andrew Joseph Rudy
(74) Attorney, Agent, or Firm — Toler Law Group, PC (57) ABSTRACT A method is disclosed for providing information related to goods available for purchase in a building. The method includes establishing a plurality of boundary zones where each of the plurality of boundary zones corresponding to a physical boundary zone within a wireless fidelity (Wi-Fi) network. The method also includes storing product information related to the goods available for purchase that are located within at least one boundary zone of the plurality of boundary zones.

11 Claims, 6 Drawing Sheets

U.S. PATENT DOCUMENTS

| | | | |
|---|---|---|---|
| 6,870,464 B2 | 3/2005 | Okamura | |
| 6,907,254 B1 | 6/2005 | Westfield | |
| 6,909,986 B2 | 6/2005 | Rogers et al. | |
| 6,944,542 B1 | 9/2005 | Eschenbach | |
| 7,082,426 B2 | 7/2006 | Musgrove et al. | |
| 7,120,420 B2 | 10/2006 | Karaoguz et al. | |
| 7,165,722 B2 | 1/2007 | Shafer et al. | |
| 7,185,204 B2 | 2/2007 | Narayanaswami et al. | |
| 7,206,753 B2 | 4/2007 | Bancroft et al. | |
| 7,225,262 B2 | 5/2007 | Macdonald | |
| 7,232,066 B2 | 6/2007 | Andreasson et al. | |
| 7,257,391 B2 | 8/2007 | Burgess et al. | |
| 7,346,564 B1 | 3/2008 | Kirklin et al. | |
| 7,366,502 B2 * | 4/2008 | Okada | 455/414.1 |
| 7,379,904 B2 | 5/2008 | Tischer | |
| 7,380,725 B2 | 6/2008 | McGill | |
| 7,383,043 B2 * | 6/2008 | Lee | 455/433 |
| 7,386,363 B2 * | 6/2008 | Murray | 700/175 |
| 7,398,093 B2 | 7/2008 | Hull et al. | |
| 7,433,831 B2 | 10/2008 | Sweeney | |
| 7,469,139 B2 * | 12/2008 | van de Groenendaal | 455/411 |
| 7,472,275 B2 * | 12/2008 | Arnouse | 713/172 |
| 7,685,134 B2 * | 3/2010 | Myka et al. | 707/622 |
| 2003/0017826 A1 | 1/2003 | Fishman et al. | |
| 2003/0118015 A1 | 6/2003 | Gunnarsson et al. | |
| 2003/0207683 A1 | 11/2003 | Lempio et al. | |
| 2003/0220116 A1 | 11/2003 | Sagefalk et al. | |
| 2004/0014422 A1 | 1/2004 | Kallio | |
| 2004/0053645 A1 | 3/2004 | Brignone et al. | |
| 2004/0122718 A1 | 6/2004 | Baumann et al. | |
| 2004/0162084 A1 | 8/2004 | Wang | |
| 2004/0166901 A1 | 8/2004 | Umesh et al. | |
| 2004/0203856 A1 | 10/2004 | Wigren et al. | |
| 2005/0177515 A1 | 8/2005 | Kalavade | |
| 2005/0207395 A1 | 9/2005 | Mohammed | |
| 2005/0239479 A1 | 10/2005 | Bednasz | |
| 2005/0260972 A1 | 11/2005 | Karaoguz et al. | |
| 2005/0260996 A1 | 11/2005 | Groenendaal | |
| 2005/0277428 A1 | 12/2005 | Nathan Brown | |
| 2006/0264211 A1 | 11/2006 | Kalhan et al. | |

FOREIGN PATENT DOCUMENTS

| | | |
|---|---|---|
| WO | 2004028070 A1 | 4/2004 |
| WO | 2006017071 A2 | 2/2006 |

OTHER PUBLICATIONS

Cisco, "Cisco Wireless Location Appliance," <http://www.cisco.com/en/US/prod/collateral/wireless/ps5755/ps6301/ ps6386/product_data_sheet0900aecd80293728.pdf> Copyright 1992-2007, USA, 7 pages.

International Search Report and Written Opinion of the International Searching Authority for International Application No. PCT/US05/23788, Mailed on February 16, 2006, 11 pages.

Supplementary European Search Report and Written Opinion for European Application No. EP 05770975.0-1244/1766803 PCT/US2005023788 dated Dec. 10, 2010, 7 pages.

International Search Report and Written Opinion of the International Searching Authority for International Application No. PCT/USO5/25262, Mailed on November 20, 2007, 9 pages.

Non-Final Office Action for U.S. Appl. No. 10/890,397 received from the United States Patent and Trademark Office (USPTO) mailed Jan. 19, 2006, 24 pages.

Final Office Action for U.S. Appl. No. 10/890,397 received from the United States Patent and Trademark Office (USPTO) mailed Jun. 13, 2006, 22 pages.

Non-Final Office Action for U.S. Appl. No. 10/890,397 received from the United States Patent and Trademark Office (USPTO) mailed Sep. 30, 2006, 16 pages.

Final Office Action for U.S. Appl. No. 10/890,397 received from the United States Patent and Trademark Office (USPTO) mailed Mar. 20, 2007, 12 pages.

Notice of Allowance and Fee(s) Due for U.S. Appl. No. 10/890,397 received from the United States Patent and Trademark Office (USPTO) mailed Jul. 18, 2007, 9 pages.

Non-Final Office Action for U.S. Appl. No. 11/853,247 received from the United States Patent and Trademark Office (USPTO) mailed May 22, 2008, 17 pages.

Final Office Action for U.S. Appl. No. 11/853,247 received from the United States Patent and Trademark Office (USPTO) mailed Oct. 23, 2008, 15 pages.

Non-Final Office Action for U.S. Appl. No. 11/853,247 received from the United States Patent and Trademark Office (USPTO) mailed Mar. 5, 2009, 21 pages.

Final Office Action for U.S. Appl. No. 11/853,247 received from the United States Patent and Trademark Office (USPTO) mailed Aug. 13, 2009, 25 pages.

Non-Final Office Action for U.S. Appl. No. 11/853,247 received from the United States Patent and Trademark Office (USPTO) mailed Dec. 18, 2009, 26 pages.

Final Office Action for U.S. Appl. No. 11/853,247 received from the United States Patent and Trademark Office (USPTO) mailed Apr. 19, 2010, 29 pages.

Requirement for Restriction/Election for U.S. Appl. No. 10/915,685 received from the United States Patent and Trademark Office (USPTO) mailed Sep. 11, 2008, 8 pages.

Non-Final Office Action for U.S. Appl. No. 10/915,685 received from the United States Patent and Trademark Office (USPTO) mailed Jan. 8, 2009, 10 pages.

Final Office Action for U.S. Appl. No. 10/915,685 received from the United States Patent and Trademark Office (USPTO) mailed Jul. 23, 2009, 9 pages.

Notice of Allowance and Fee(s) Due for U.S. Appl. No. 10/915,685 received from the United States Patent and Trademark Office (USPTO) mailed Jan. 19, 2010, 11 pages.

* cited by examiner

SYSTEM AND METHOD FOR ADVERTISING TO A WI-FI DEVICE

CLAIM OF PRIORITY

The present application claims priority from and is a divisional of patent application Ser. No. 10/915,685, now U.S. Pat. No. 7,730,485, filed on Aug. 10, 2004 and entitled "System and Method for Advertising to a Wi-Fi device," the contents of which are expressly incorporated herein by reference in their entirety. The present application also claims priority from patent application Ser. No. 10/890,397, now U.S. Pat. No. 7,286,834, filed on Jul. 13, 2004 and entitled "System and Method for Location Based Policy Management."

FIELD OF THE DISCLOSURE

The present disclosure relates generally to advertisement for Wi-Fi networks.

BACKGROUND

Short-range wireless data networks, e.g., wireless fidelity (Wi-Fi) networks, have become commonplace and can be found in homes, coffee shops, book stores, and other places of business. Wi-Fi standards, such as IEEE 802.11x, provide network users with mobility and network access. For example, a user with a Wi-Fi device can enter a Wi-Fi coverage area and obtain a connection in order to have access to a network. Moreover, Wi-Fi networks are relatively easy to deploy.

Advertisers and marketers have yet to provide a sophisticated but user-friendly scheme for providing product information to Wi-Fi devices.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION

In a particular embodiment, a method provides information related to goods available for purchase in a building. The method includes establishing a plurality of boundary zones where each of the plurality of boundary zones corresponds to a physical boundary zone within a wireless fidelity (Wi-Fi) network. The method also includes storing product information related to the goods available for purchase that are located within at least one boundary zone of the plurality of boundary zones.

In a particular embodiment, a system is disclosed for sending and receiving retail product data. The system includes a wireless fidelity (Wi-Fi) network. The Wi-Fi network is divided into a plurality of boundary zones where each of the plurality of boundary zones corresponds to a physical boundary zone within the Wi-Fi network. The system also includes at least one server. The at least one server includes product data related to one or more products available within at least one boundary zone of the plurality of boundary zones.

In a particular embodiment, a computer readable medium is disclosed that includes instructions to establish a plurality of boundary zones. Each of the plurality of boundary zones corresponds to a physical boundary zone within a wireless fidelity (Wi-Fi) network. The computer readable medium also includes instructions to store product information related to the goods available for purchase that are located within at least one boundary zone of the plurality of boundary zones.

In a particular embodiment, product information is provided to the Wi-Fi device via a graphical user interface at a display on the Wi-Fi device. The graphical user interface includes an outer boundary that represents the perimeter of the retail building and at least one graphical representation of a product shelf. Moreover, the graphical user interface includes a plurality of virtual boundary zones adjacent to the at least one graphical representation of the product shelf.

In a particular embodiment, product information is provided to the Wi-Fi device as a cursor is moved between the virtual boundary zones. The product information corresponds to products available in an actual boundary zone that corresponds to the virtual boundary zone. Movement of the cursor between a first boundary zone and a second boundary zone can be detected, and a second set of product information can be provided to the Wi-Fi device after detecting that the cursor has moved to the second boundary zone. In a particular embodiment, at least one graphical representation of a product is displayed. The graphical representation of the product corresponds to an actual product available in the retail building. Moreover, a brand image or logo can be displayed for the product. A system owner can charge a fee to display the brand image.

In a particular embodiment, the product information can include a price of a product, a location of a product, a route to find a product, an availability of a product, a coupon for a product, a promotion for a product, an advertisement for a product, or any combination thereof.

In a particular embodiment, a Wi-Fi device includes a processor. The processor includes a computer readable medium and a computer program that is embedded within the computer readable medium. The computer program includes a plurality of virtual boundary zones. Each of the plurality of virtual boundary zones corresponds to a physical boundary zone within a Wi-Fi network. The computer program can also include instructions to display product information when the Wi-Fi device enters a Wi-Fi network.

In a particular embodiment, a system for sending and receiving retail product data is provided and includes a Wi-Fi network. The Wi-Fi network is divided into a plurality of boundary zones within a predetermined region. Further, the system can include a server that includes product data related to one or more products available within each of the plurality of boundary zones.

In a particular embodiment, a system is provided for sending and receiving retail product data. The system includes a first W-Fi access point, a second Wi-Fi access point, and a third Wi-Fi access point. A switch is coupled to the first access point, the second access point, and the third access point. Moreover, the first Wi-Fi access point, the second Wi-Fi access point, and the third Wi-Fi access point can establish a Wi-Fi network. The Wi-Fi network can be divided into a plurality of boundary zones within a predetermined region. Also, the system can include a server that is coupled to the switch. The server includes product data that is related to one or more products available within each of the plurality of boundary zones.

In a particular embodiment, a method of providing information related to goods available for purchase in a building is provided. The method includes providing remote access to a virtual store. The virtual store corresponds to the building. Further, the virtual store is divided into a plurality of virtual boundary zones. Each of the plurality of virtual boundary zones corresponds to a physical boundary zone within the building. Product information that is related to the goods available for purchase within each physical boundary zone can be displayed when a user selects at least one of the plurality of virtual boundary zones.

Figure 1:
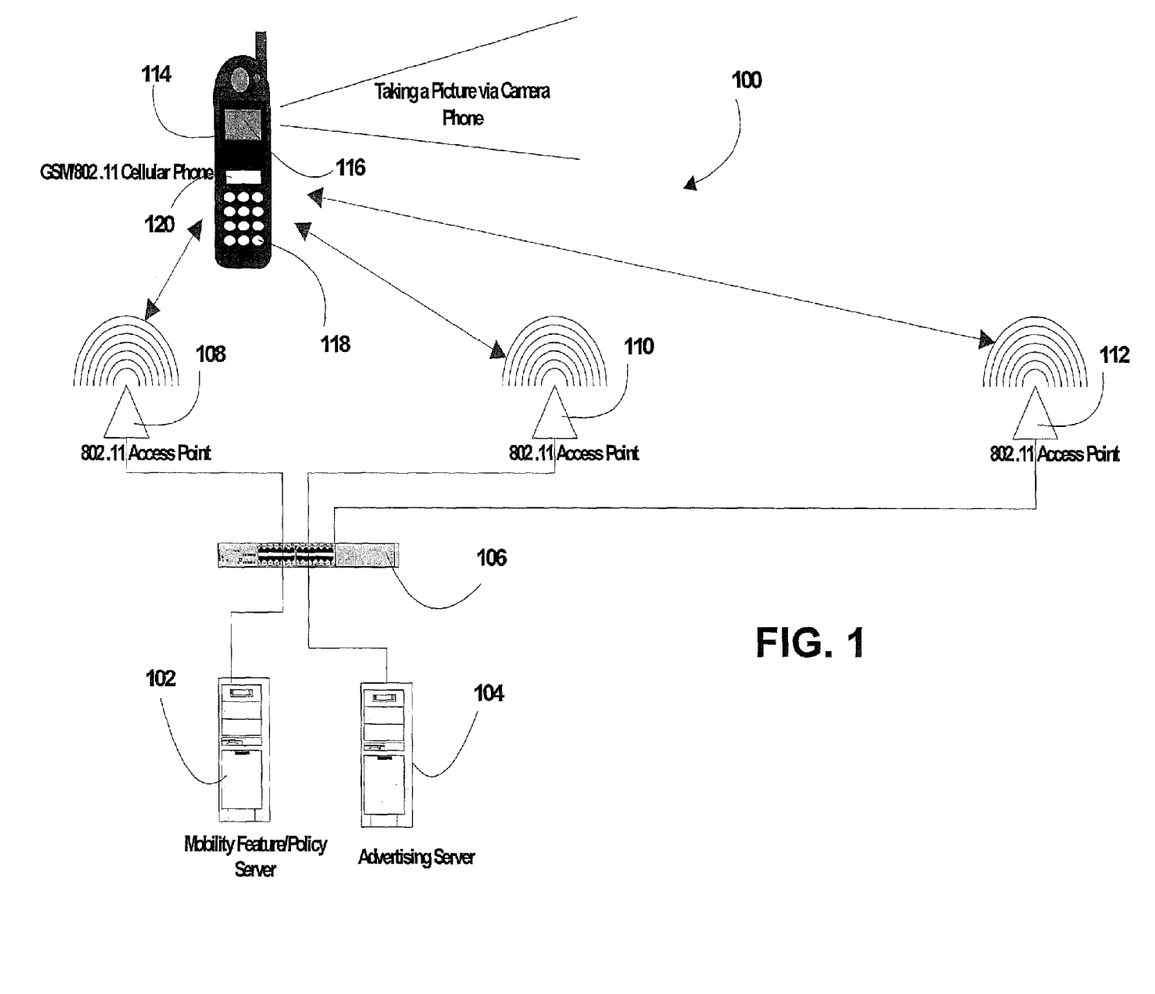
FIG. 1 is a block diagram of a particular embodiment of a wireless fidelity (Wi-Fi) network system.

Referring to FIG. 1, a Wi-Fi network system is illustrated and is generally designated 100. As illustrated in FIG. 1, the system 100 includes a mobility feature/policy server 102 and an advertising server 104. In a particular embodiment, the mobility feature/policy server 102 includes logic for locating and monitoring a Wi-Fi device within the Wi-Fi network system 100. An example of that logic is described in detail in U.S. patent application Ser. No. 10/890,397, filed Jul. 13, 2004, entitled "System and Method for Location Based Policy Management" by Edward Walter, which is incorporated herein by reference it its entirety. In a particular embodiment, the advertising server 104 includes logic for providing product related information to a Wi-Fi device when it enters the Wi-Fi network system 100.

As shown in FIG. 1, the mobility feature/policy server 102 and the advertising server 104 can be connected to a switch 106. Further, a first access point 108, a second access point 112, and a third access point 114 can be connected to the switch 106. In an illustrative embodiment, the access points 108, 110, 112 are Wi-Fi base stations having Wi-Fi antennae, e.g., IEEE 802.11 antennae.

FIG. 1 also shows a Wi-Fi device 114 (e.g., a (GSM) cellular telephone, an IEEE 802.11 cellular phone, a Wi-Fi portable data assistant (PDA), a Wi-Fi laptop computer, etc.). The Wi-Fi device 114 can communicate with the mobility feature/policy server 112 and the advertising server 114 via one or more of the access points 118, 120, 122. As depicted in FIG. 1, the Wi-Fi device 114 can include a display screen 116 and a keypad 118. The keypad 118 includes a plurality of keys that can be pressed, or otherwise toggled, by a user during operation of the Wi-Fi device 114. The Wi-Fi device 114 further includes a microprocessor 120 having a computer readable medium. Logic can be embedded within the computer readable medium for receiving shopping information and displaying the shopping information at the Wi-Fi device 114.

Figure 2:
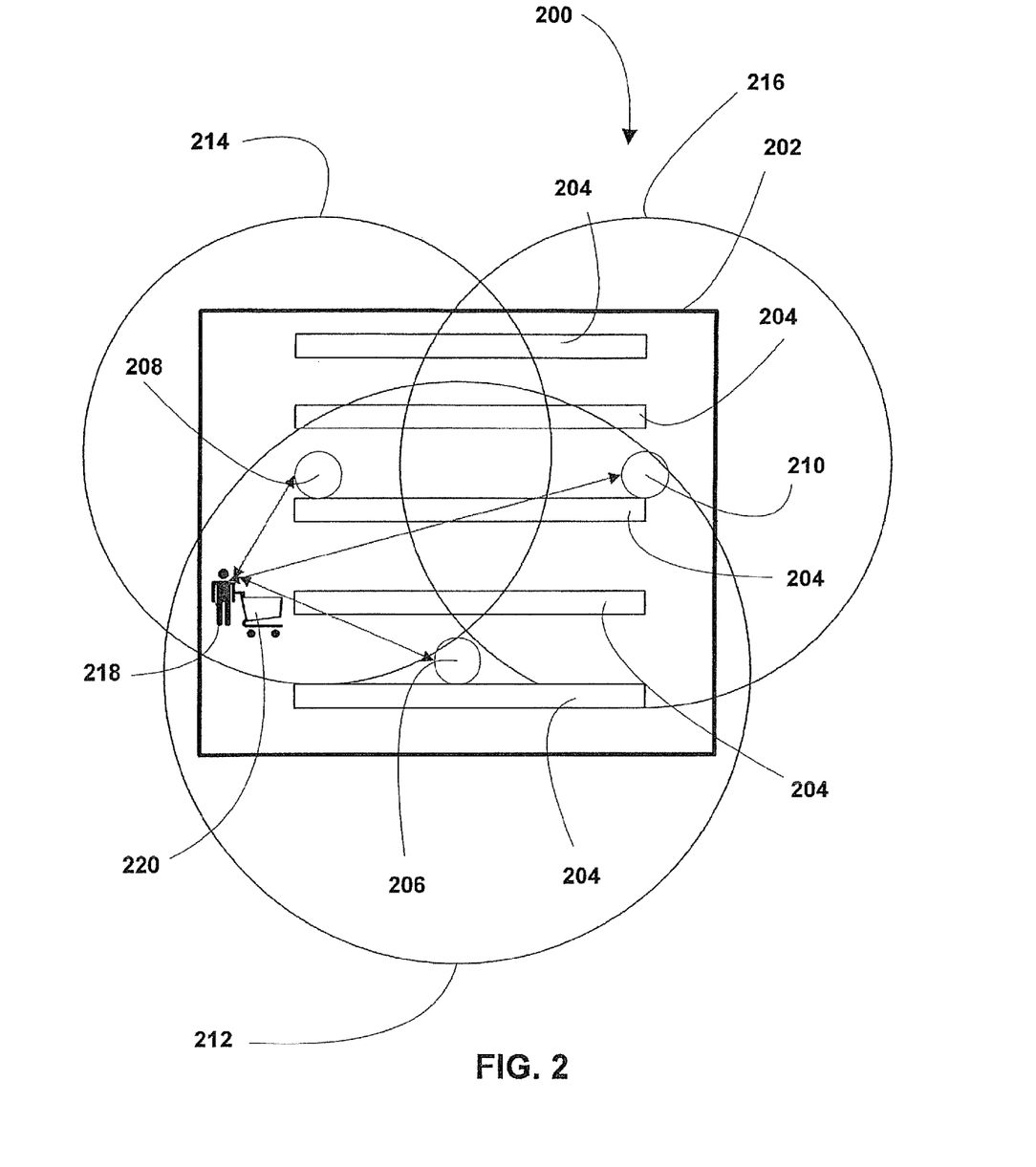
FIG. 2 is a general diagram of a particular embodiment of a retail shopping system including a Wi-Fi network.

FIG. 2 illustrates a retail shopping system, generally designated 200. As shown, the retail shopping system 200 includes a retail building 202 in which a plurality of shopping shelves 204 can be disposed in order to support a variety of goods that are available for purchase within the retail shopping system 200. FIG. 2 also depicts a first Wi-Fi access point 206, a second Wi-Fi access point 208, and a third Wi-Fi access point 210. The first Wi-Fi access point 206 provides a first Wi-Fi coverage zone 212. The second Wi-Fi access point 208 provides a second Wi-Fi coverage zone 214. Further, the third Wi-Fi access point 210 provides a third Wi-Fi coverage zone 216.

As illustrated in FIG. 2, the access points 206, 208, 210 maybe strategically placed within the retail building 202 so that the Wi-Fi coverage zones 212, 214, 216 provide complete Wi-Fi coverage throughout the retail building 202 and establish a Wi-Fi network within the retail building 202. FIG. 2 also shows a retail shopper 218 and a retail shopping cart 220. In a particular embodiment, the retail shopper 218 can move through the retail building 202 with the shopping cart 220 in order to browse the goods that are available for purchase within the retail building (i.e., the goods that are disposed on the product shelves 204).

Figure 3:
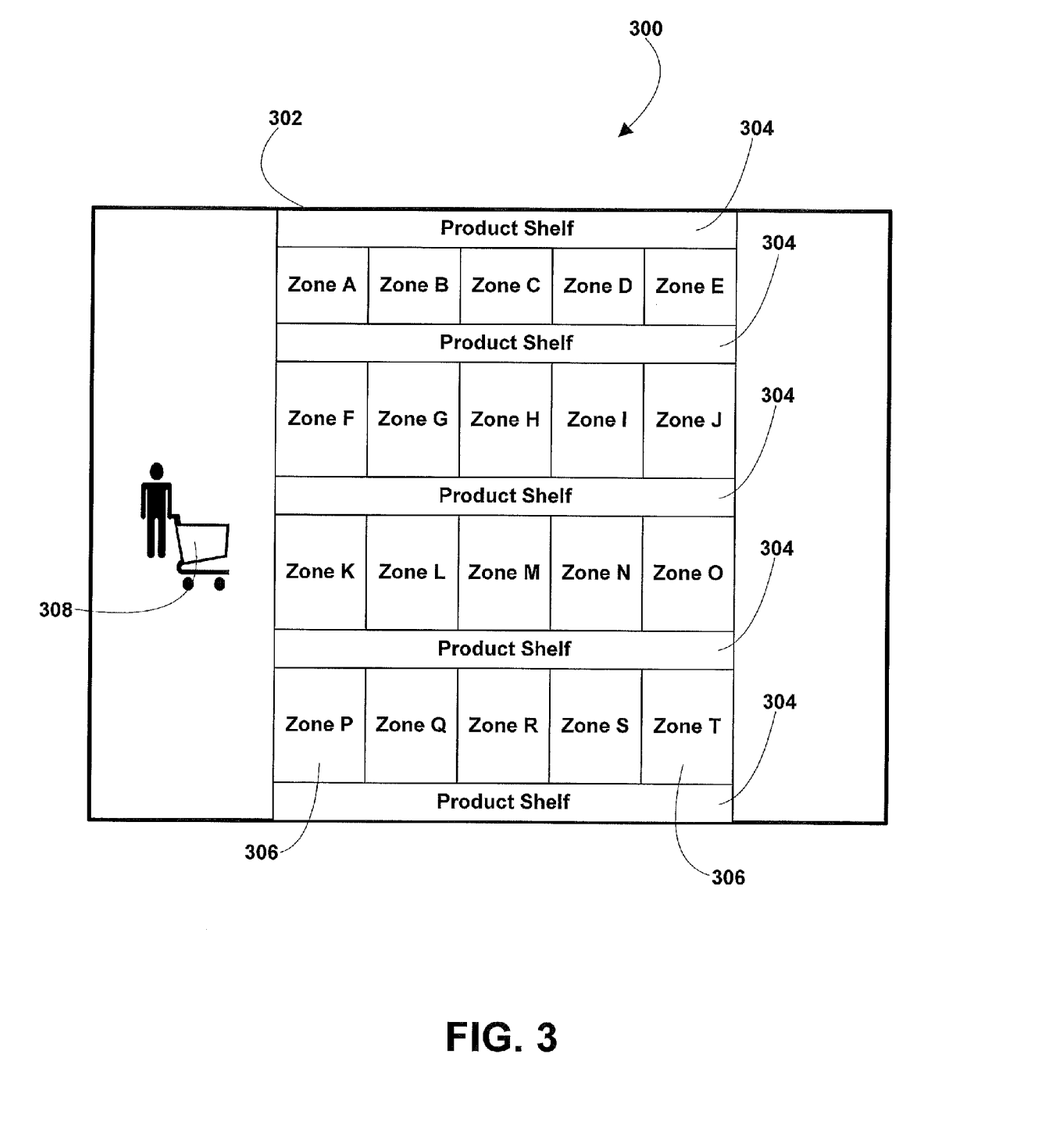
FIG. 3 is a general diagram illustrating a particular embodiment of a graphical user interface that can be used to access information regarding retail goods for sale in a building.

FIG. 3 depicts a graphical user interface 300 that can be displayed at the display screen 116 (FIG. 1) of the Wi-Fi device 114 (FIG. 1). As depicted in FIG. 3, the GUI 300 includes an outer boundary 302 that represents the perimeter of the retail building 202 (FIG. 2). Also, the GUI 300 includes a plurality of graphical representations of products shelves 304. FIG. 3 further illustrates a plurality of boundary zones 306 that are established along the aisles between adjacent product shelves 304. In an illustrative embodiment, there are five boundary zones 306 along four aisles for a total of twenty (20) boundary zones 306 that are labeled from A to T (i.e., Zone A, Zone B, Zone C, . . . , Zone T). More or less boundary zones 306 can be established within the GUI 300 depending on the size of the actual retail building that corresponds to the boundary 302 provided by the graphical user interface 300. As further indicated in FIG. 3, the GUI 300 can include a cursor 308 to aid in moving between the boundary zones 306 presented by the graphical user interface 300. In an illustrative embodiment, the cursor 308 is a shopper/cart graphic that represents a virtual shopper.

During operation, a user can select a virtual boundary zone 306 displayed at the Wi-Fi device 114 (FIG. 1) in order to obtain information related to retail goods that are located in the corresponding physical boundary zone. In a particular embodiment, the boundary zone 306 is selected by moving the shopper/cart graphic 308 into the boundary zone 306 of interest. The product information can include price, availability, location, promotions, coupons, etc.

Figure 4:
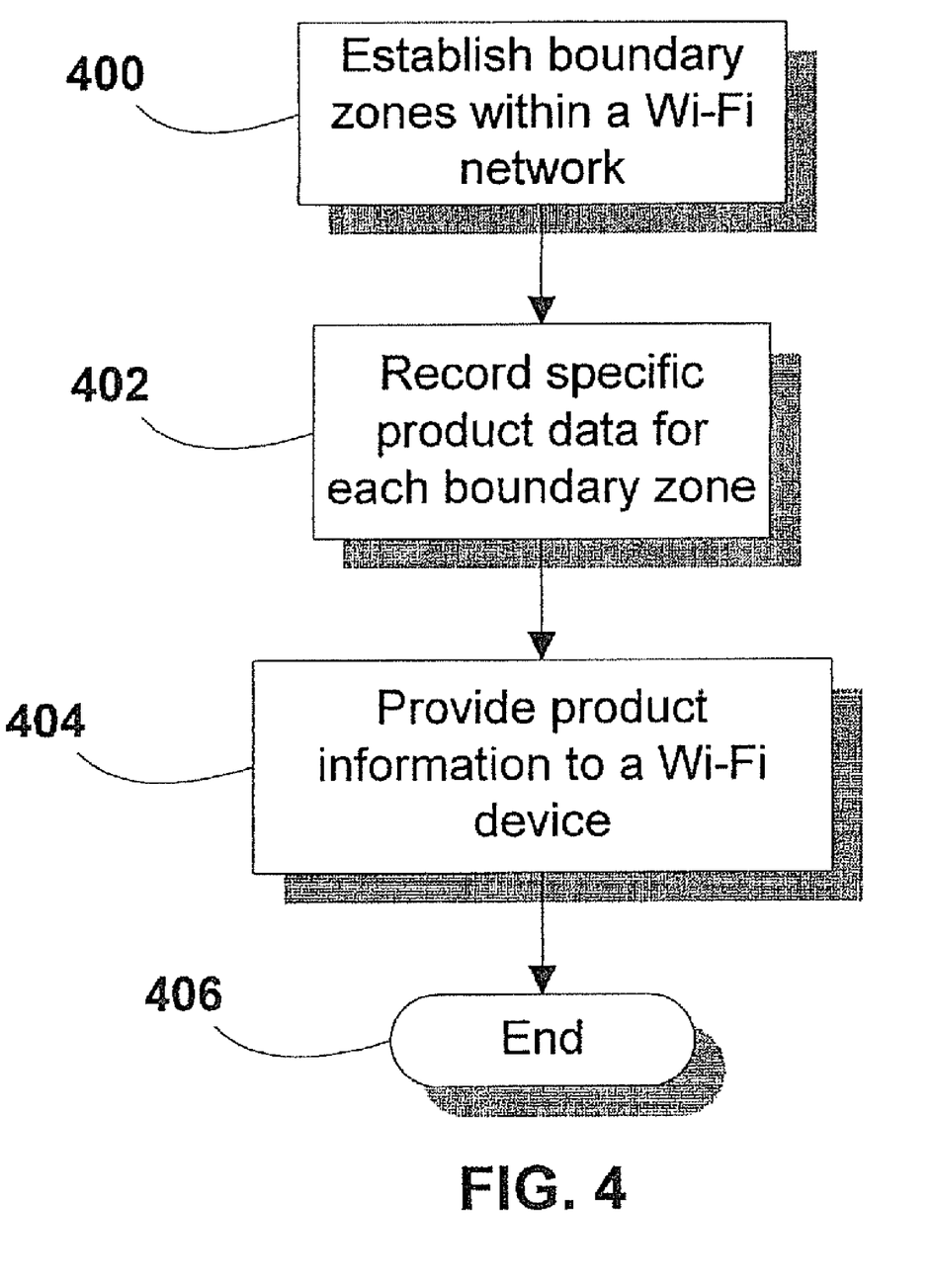
FIG. 4 is a flow chart illustrating a particular embodiment of general configuration logic.

Referring to FIG. 4, an illustrative embodiment of general configuration logic is shown commencing at block 400 where a plurality of boundary zones are established within a Wi-Fi network. At block 402, specific product data is recorded for each boundary zone that corresponds to the specific retail goods that are available within each boundary zone. The product data can include price, location, availability, advertisements, promotions, coupons, etc. Moving to block 404, the product information is provided to a Wi-Fi device. The logic then ends at state 406.

Figure 5:
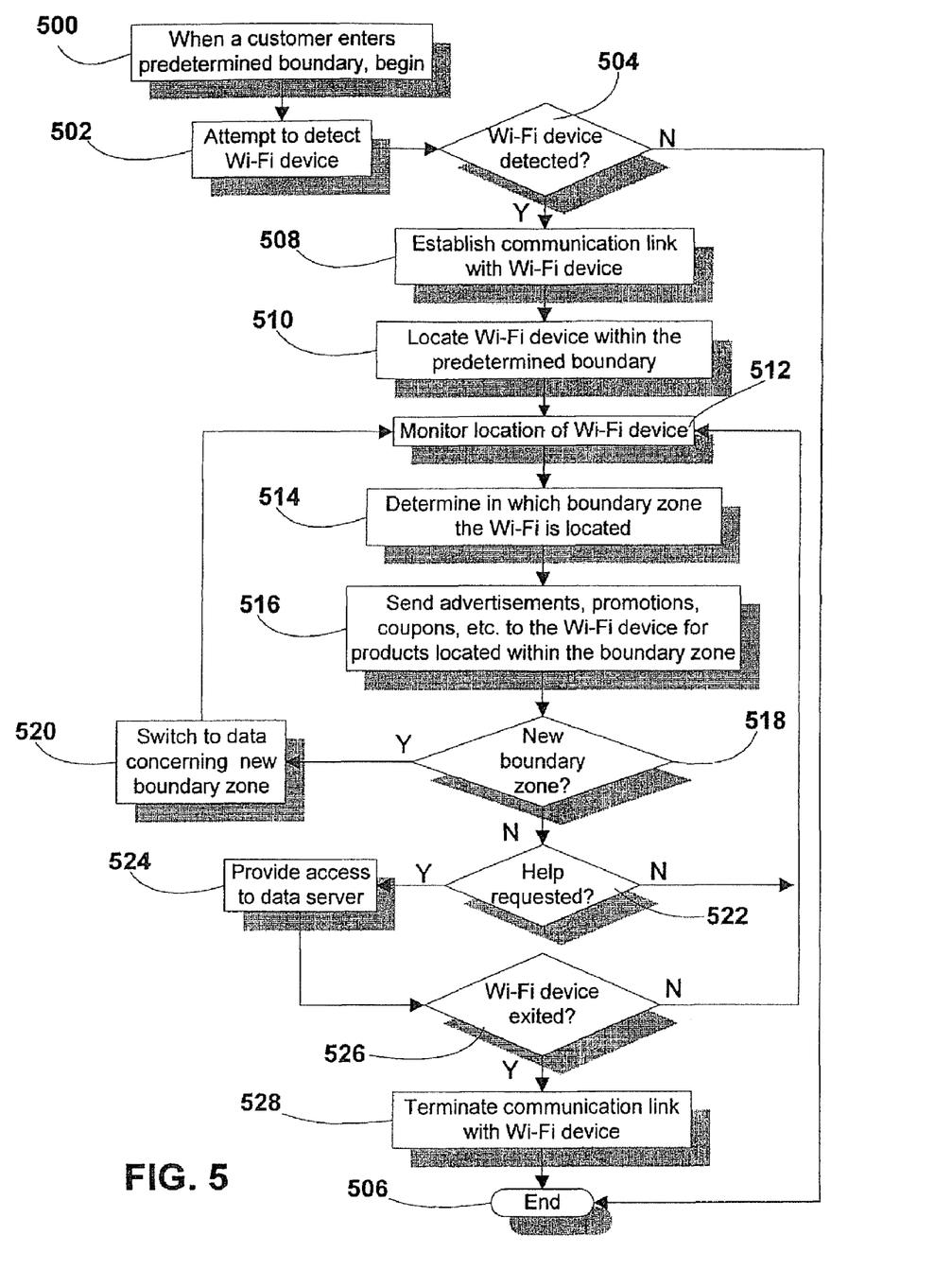
FIG. 5 is a flow chart illustrating a particular embodiment of logic that can be used to provide information regarding retail goods to a shopper within a retail building via a Wi-Fi device.

FIG. 5 is a flow chart illustrating logic that can be used to provide information regarding retail goods to a shopper within a retail building. Beginning at block 500, the following steps are performed when a customer enters a predetermined boundary. In an illustrative embodiment, the boundary is the perimeter of the retail building 202 (FIG. 2). Moving to block 502, an attempt is made to detect a Wi-Fi device, e.g., the Wi-Fi device 114 portrayed in FIG. 1. At decision step 504, a decision is made in order to determine whether a Wi-Fi device 114 (FIG. 1) is detected. If a Wi-Fi device 114 (FIG. 1) is not detected, the logic ends at state 506. On the other hand, if a Wi-Fi device 114 (FIG. 1) is detected, the logic proceeds to block 508 and a communication link is established with the Wi-Fi device 114 (FIG. 1).

Moving to block 510, the Wi-Fi device 114 (FIG. 1) is located within the predetermined boundary. At block 512, the location of the Wi-Fi device 114 (FIG. 1) is monitored. Thereafter, the boundary zone in which the Wi-Fi device 114 (FIG. 1) is located is determined at block 514. Proceeding to block 516, product information is sent to the Wi-Fi device 114 (FIG. 1). In an illustrative embodiment, the product information corresponds to products that are located within the actual detected physical boundary zone in which the Wi-Fi device 114 (FIG. 1) is currently located.

Continuing to decision step 518, a determination is made in order to ascertain whether the user, and the corresponding Wi-Fi device 114 (FIG. 1), have entered a new boundary zone. If so, the logic moves to block 520 and the system switches to data concerning the new boundary zone in which the Wi-Fi device 114 (FIG. 1) is located. The logic then returns to block 512 and continues as described above. If a new boundary zone is not entered at decision step 518, the logic proceeds to decision step 522 and a decision is made in order to determine whether help is requested. If help is not requested, the logic returns to step 512 and continues as described above.

If help is requested, the logic continues to block 524 and access is provided to a help server, e.g., the advertising server 114 shown in FIG. 1. Using the help feature, a user can locate specific products anywhere in the store, determine if a product of interest is available anywhere in the store, find out if any coupons are available, determine if a product is on sale, etc. At decision step 526, a decision is made to determine if the Wi-Fi device 114 (FIG. 1) has exited the predetermined boundary, e.g., the perimeter of the retail building 202 (FIG. 2). If the Wi-Fi device 114 (FIG. 1) is still within the predetermined boundary, the logic returns to block 512 and continues as described above. If the Wi-Fi device 114 (FIG. 1) exits the predetermined boundary, the logic moves to block 528 and the connection to the Wi-Fi device 114 (FIG. 1) is terminated. The logic ends at state 506.

Figure 6:
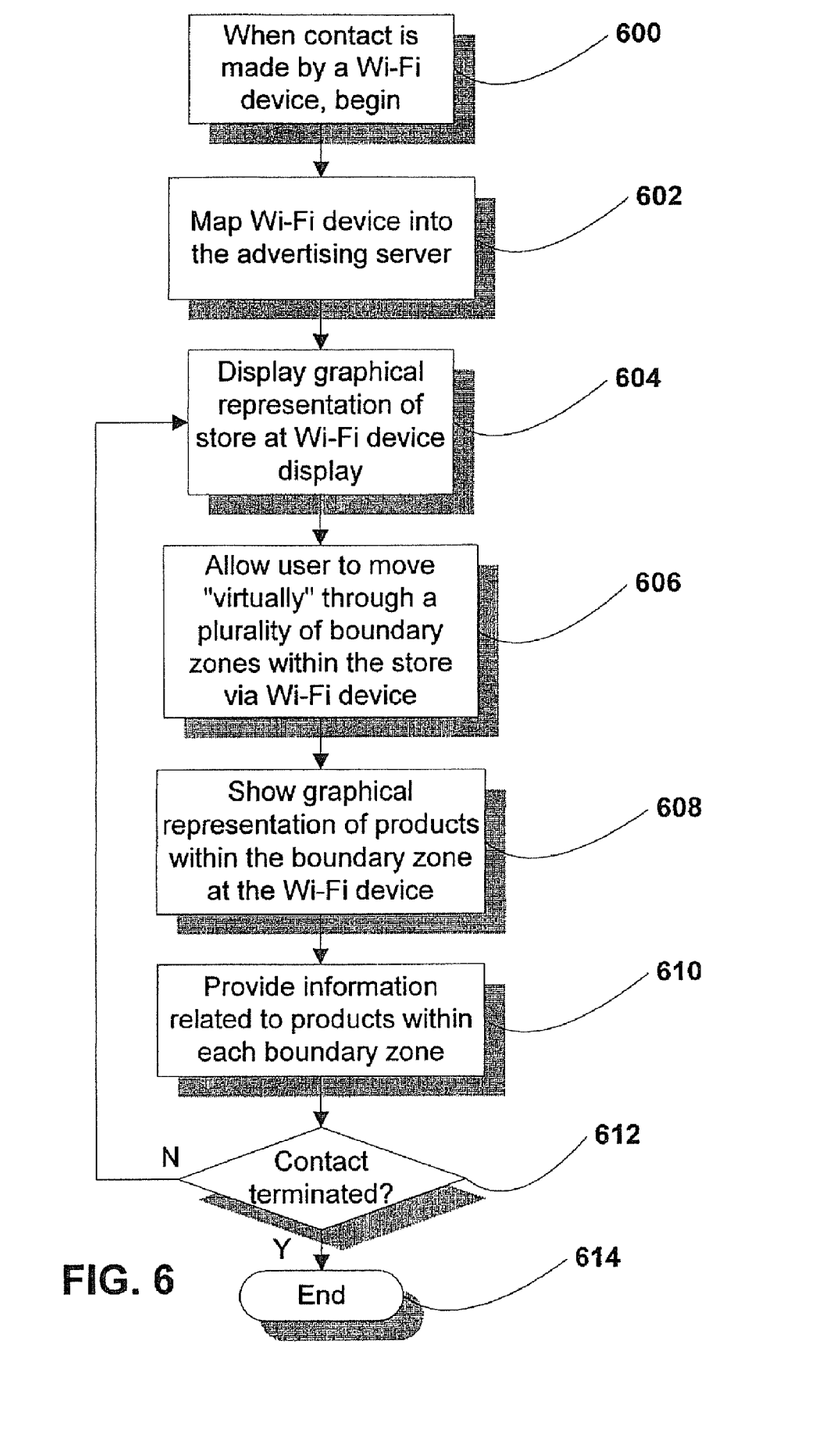
FIG. 6 is a flow chart illustrating a particular embodiment of logic that can be used to provide information regarding retail goods to a virtual shopper via a Wi-Fi device.

Referring now to FIG. 6, a flow chart illustrating logic that can be used to provide information regarding retail goods to a virtual shopper is shown and commences at block 600 when contact is made by a Wi-Fi device 114 (FIG. 1). The contact can be made through a telephone connection, a wireless Internet connection, or a Wi-Fi connection. At block 602, the Wi-Fi device 114 (FIG. 1) is mapped into the advertising server. Moving to block 604, a graphical representation of the retail building, e.g., the GUI 300 shown in FIG. 3, is displayed at the display 116 (FIG. 1) of the Wi-Fi device 114 (FIG. 1). At block 606, a user is allowed to move "virtually" through a plurality of boundary zones within the retail building via the Wi-Fi device 114 (FIG. 1). Next, graphical representations of products within each boundary zone are displayed at the Wi-Fi device 114 (FIG. 1) as the user moves "virtually" through the boundary zones.

Proceeding to block 610, information related to products within each physical boundary zone corresponding to each virtual boundary zone is provided. At decision step 612, a determination is made in order to ascertain whether the contact has been terminated by the user. If the contact is not terminated, the logic returns to block 604 and continues as described above. If the contact is terminated by the user, the logic ends at state 614.

With the configuration of structure described above, the system and method for advertising to a Wi-Fi device provides a method to transmit specific product data to a Wi-Fi device that corresponds to products located in a specific physical boundary zone established within a Wi-Fi network. The system can accurately identify the location of a store patron within the Wi-Fi network. In an illustrative embodiment, the boundary zones are defined by a store owner. A patron location may be determined by triangulating a Wi-Fi device signal using three or more access points. The detected location may be compared to the perimeter of each zone established within the Wi-Fi network to identify a patron location and a current zone.

The system can also identify specific products that are physically located and mapped in relation to a store patron. This requires the use of a store's "product location" database, i.e., the advertising server. In a particular embodiment, the advertising server can store coordinates for each individual item within the store. As a patron approaches the coordinates of a specific product, advertisements, promotional information, and product information can be displayed on his or her Wi-Fi device. Further, since the coordinates are known for each product within the store, and the location of the patron is known, directions can be provided to the products.

The system automates the ability to find products within a store and saves valuable labor resources that can be used to perform other tasks. In addition, the system allows for increased benefit over manually asking for directions. For example, a shopping list can be input into a search engine via the Wi-Fi device and the quickest route for locating all of the available products on the shopping list can be mapped for the customer and displayed at the Wi-Fi device. Thus, the customer's time in the store is used most efficiently.

Moreover, in a particular embodiment, the present system can provide product branding at the Wi-Fi device and companies can pay to have their advertisements displayed at the Wi-Fi device while they are within a particular store or within a particular area of a store. For example, if a store patron is located in the shoe department of a particular store one or more advertisements for Nike can be presented to the user at the Wi-Fi device. Also, in another particular embodiment, the present system can allow a user to purchase goods via the Wi-Fi device and avoid having to spend time in a check-out line. Further, in a particular embodiment, a user can point, or move, his or her Wi-Fi device near a particular product to get information about that product.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   establishing a plurality of boundary zones, each of the plurality of boundary zones corresponding to a physical boundary zone within a wireless fidelity network;
   storing product information at a server, the product information related to goods available for purchase that are located within at least one boundary zone of the plurality of boundary zones;
   establishing a communication link between the server and a wireless device via the wireless fidelity network in response to detecting that the wireless device has entered a first boundary zone of the plurality of boundary zones; and
   sending first product information from the server to the wireless device via the communication link, the first product information related to the goods available for purchase that are located within the first boundary zone, wherein the first product information is presented to a user via a graphical user interface at the wireless device, and wherein the graphical user interface includes a graphical representation of the plurality of boundary zones.

2. The method of claim 1, wherein the first product information indicates at least one shelf that is located within the first boundary zone and indicates one or more goods located on the at least one shelf.

3. The method of claim 2, wherein the first product information presented via the graphical user interface includes a graphical representation of the goods available for purchase within the first boundary zone.

4. The method of claim 3, further comprising:
monitoring a location of the wireless device;
detecting movement of the wireless device between the first boundary zone and a second boundary zone; and
providing second product information to the wireless device after detecting that the wireless device moved within the second boundary zone.

5. The method of claim 4, wherein a location of the wireless device within the second boundary zone is determined and wherein the graphical user interface is updated to display the determined location of the wireless device.

6. The method of claim 1, wherein the graphical representation of the plurality of boundary zones comprises:
an outer boundary representing a perimeter of a building;
at least one graphical representation of a product shelf; and
a plurality of virtual boundary zones adjacent to the at least one graphical representation of the product shelf, wherein each virtual boundary zone in the plurality of virtual boundary zones corresponds to one of the plurality of boundary zones.

7. The method of claim 6, further comprising providing additional product information to the wireless device when a cursor displayed at the graphical user interface is moved within one of the plurality of virtual boundary zones.

8. The method of claim 7, further comprising:
detecting movement of the cursor to a particular virtual boundary zone; and
providing third product information to the wireless device in response to detecting the cursor movement.

9. The method of claim 1, wherein the product information includes at least one of a price of a product, a location of a product, a route to find a product, an availability of a product, a coupon for a product, a promotion for a product, and an advertisement for a product.

10. A non-transitory computer readable medium comprising instructions that, when executed by a processor, cause the processor to:
establish a plurality of boundary zones, each of the plurality of boundary zones corresponding to a physical boundary zone within a wireless fidelity network;
store product information related to goods available for purchase that are located within at least one boundary zone of the plurality of boundary zones;
establish a communication link between the server and a wireless device via the wireless fidelity network in response to detecting that the wireless device has entered a first boundary zone of the plurality of boundary zones; and
send first product information from the server to the wireless device via the communication link, the first product information related to the goods available for purchase that are located within the first boundary zone, wherein the first product information is accessible to a user of the wireless device via a graphical user interface, and wherein the graphical user interface includes a graphical representation of the plurality of boundary zones.

11. The non-transitory computer readable medium of claim 10, further comprising instructions to transmit second product information to the wireless device based on a determination that the wireless device has moved to a second boundary zone within the wireless fidelity network.

* * * * *